(12) United States Patent
Schwamborn (10) Patent No.: US 12,250,094 B2
(45) Date of Patent: Mar. 11, 2025

(54) METHOD, SYSTEM, AND GATEWAY FOR LINKING TIME-SENSITIVE FIELDBUSES

(71) Applicant: WAGO Verwaltungsgesellschaft mbH, Minden (DE)

(72) Inventor: Fabian Schwamborn, Lemgo (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 383 days.

(21) Appl. No.: 17/748,775

(22) Filed: May 19, 2022

(65) Prior Publication Data

US 2022/0278871 A1 Sep. 1, 2022

Related U.S. Application Data

(63) Continuation of application No. PCT/EP2020/082919, filed on Nov. 20, 2020.

(30) Foreign Application Priority Data

Nov. 20, 2019 (DE) ..................... 10 2019 217 913.4

(51) Int. Cl.
*H04L 12/403* (2006.01)
*H04L 7/00* (2006.01)
*H04L 12/66* (2006.01)

(52) U.S. Cl.
CPC ........ *H04L 12/4035* (2013.01); *H04L 7/0008* (2013.01); *H04L 12/66* (2013.01)

(58) Field of Classification Search
None
See application file for complete search history.

(56) References Cited

U.S. PATENT DOCUMENTS

| 7,508,824 B2 | 3/2009 | Kasper et al. |
| 7,668,182 B2 | 2/2010 | Hetzel et al. |
| 8,356,431 B2 | 1/2013 | Pratt, Jr. et al. |

(Continued)

FOREIGN PATENT DOCUMENTS

| CN | 101919208 A | 12/2010 |
| DE | 10220334 A1 | 11/2003 |

(Continued)

OTHER PUBLICATIONS

International Search Report dated Feb. 24, 2021 in corresponding application PCT/EP2020/082919.

*Primary Examiner* — Benjamin Lamont
(74) *Attorney, Agent, or Firm* — Muncy, Geissler, Olds & Lowe, P.C.

(57) ABSTRACT

A method for linking a first time-sensitive fieldbus to a second time-sensitive fieldbus, wherein the first time-sensitive fieldbus includes a first subscriber device and has its own first time domain and wherein the second time-sensitive fieldbus includes a second subscriber device and has its own second time domain. The first time domain and the second time domain are frequency-synchronized, wherein the first and the second fieldbuses are connected to one another by a gateway for data transmission, wherein the method determines a first cycle duration of the first time domain and a second cycle duration of the second time domain by the gateway at a reference time. A time offset is determined between the first time domain and the second time domain by the gateway at the reference time.

23 Claims, 4 Drawing Sheets

(56) References Cited

U.S. PATENT DOCUMENTS

| | | | |
|---|---|---|---|
| 9,756,590 B2 | 9/2017 | Koenigseder et al. | |
| 2003/0115369 A1 | 6/2003 | Walter et al. | |
| 2011/0235648 A1* | 9/2011 | Ando | H04J 3/0652 |
| | | | 370/401 |
| 2014/0355518 A1* | 12/2014 | Brown | H04W 88/16 |
| | | | 370/328 |
| 2015/0103832 A1* | 4/2015 | Chandhoke | H04L 49/206 |
| | | | 370/392 |
| 2016/0080533 A1* | 3/2016 | Jeon | H04L 12/66 |
| | | | 370/402 |
| 2017/0201964 A1* | 7/2017 | Gupta | H04W 76/40 |
| 2019/0322299 A1* | 10/2019 | Mong | B61L 15/0072 |
| 2020/0213022 A1* | 7/2020 | Götz | H04J 3/0697 |
| 2021/0014168 A1* | 1/2021 | Geng | H04L 45/121 |
| 2021/0091919 A1* | 3/2021 | Geng | H04L 7/0008 |

FOREIGN PATENT DOCUMENTS

| | | |
|---|---|---|
| DE | 102004009889 A1 | 9/2004 |
| DE | 102012204586 A1 | 10/2013 |
| DE | 102015212561 A1 | 1/2017 |

* cited by examiner

METHOD, SYSTEM, AND GATEWAY FOR LINKING TIME-SENSITIVE FIELDBUSES

This nonprovisional application is a continuation of International Application No. PCT/EP2020/082919, which was filed on Nov. 20, 2020, and which claims priority to German Patent Application No. 10 2019 217 913.4, which was filed in Germany on Nov. 20, 2019, and which are both herein incorporated by reference.

BACKGROUND OF THE INVENTION

Field of the Invention

The present invention relates to time-sensitive fieldbus systems, in particular industrial fieldbus systems for controlling industrial systems. In particular, the invention relates to a method, a system, and a gateway for linking at least two time-sensitive fieldbuses.

Description of the Background Art

Fieldbuses serve to connect different subscriber devices (e.g., field devices such as sensors, actuators, transducers, positioners, etc., as well as controllers such as, e.g., control devices or programmable controllers, programmable logic controllers, PLCs, etc.) in a facility (e.g., industrial manufacturing facility, vehicle, building, etc.) for the purpose of communication with one another. The communication in this context takes place especially, but not exclusively, between different field devices and a fieldbus controller that controls and monitors the processes running in the facility. A subscriber device can be a field device or a controller and has, in particular, an interface to the fieldbus.

At least some of the messages to be transmitted over a fieldbus (e.g., data blocks, data streams) in this context are time-sensitive, which is to say they have real-time requirements with regard to transmission latency. For example, it is necessary with time-sensitive data of this nature for a message sent by one subscriber device to be received reliably within a predictable time period by the fieldbus controller or by another field device connected to the fieldbus.

The data to be transmitted between subscriber devices of the fieldbus include not only communication of values, such as, e.g., measurement values, control values, or instructions, but also communication of events for time coordination of machines and facility components. For example, the coordination and synchronization of motions of machine parts increasingly no longer takes place through mechanical devices (e.g., metal presses with rigidly mechanically coupled loading devices and ejector devices in the machine cycle, camshafts, transmissions, etc.), but instead through digital messages that are transmitted over fieldbuses with real-time requirements.

A fieldbus is assigned to a time domain in which all subscriber devices each have a timing element (e.g., a clock). The timing elements of the subscriber devices are synchronized with one another within the time domain and thus have a shared understanding of the time. As a result, all subscriber devices of a fieldbus can follow a defined fieldbus communication cycle, and are matched to one another in order to execute the appropriate actions at the correct time. One subscriber device of the fieldbus functions as the master for the time domain in this case, wherein the timing element of the master supplies the time reference for the other subscriber devices of the time domain. The latter subscriber devices, which derive their time from the master within the time domain, are also referred to as slaves. The role of the time master in the fieldbus can be assumed here by a fieldbus controller, but also by a different subscriber device connected to the fieldbus. The time master of the fieldbus can synchronize its time base with another time base, for example with the time master of another fieldbus or with a time base at a higher level in the hierarchy. One time domain can also encompass multiple fieldbuses in that the masters of multiple fieldbuses synchronize their respective fieldbus time with one another. Although the "clocks" are adjusted through the synchronization of the time base, this does not necessarily mean that two fieldbuses within a time domain have the same communication cycles.

A first generation of fieldbuses was developed to use digital transmission technology in order to replace the cabling complexity resulting from the previously customary parallel wiring of machine components using cable harnesses. Multiple fieldbus protocols, some of them proprietary, were developed for this purpose. Later generations of fieldbuses are based primarily on the IEEE 802.3 Ethernet standard, wherein the Ethernet protocols were modified or extended to implement time-sensitive networks (TSN).

Standards for real-time Ethernet protocols were developed by the IEEE 802.1Q task group for TSN networks, for example. A time-aware scheduler (scheduler that supports real time) is defined by the IEEE 802.1QBv standard, for example. The scheduler makes it possible to divide the communication in a network into fixed, periodically repeating communication cycles, and to define, reserve, or negotiate fixed time slots within the cycles for the transmission of time-critical data. In this way, a timed end-to-end transmission between two subscriber devices can be implemented.

Non-time-sensitive data (best-effort data) can be transmitted outside the time slots designated for real-time transmission, wherein the known protocols for packet-switched transmission (e.g., Ethernet protocol) are used for this purpose. Guard bands can be set up by the time-aware scheduler in order to avoid an overlapping of transmissions of non-time-sensitive data packets with the time slots reserved for real-time transmission.

In addition, it is possible in TSN networks to interrupt the transmission of non-time-sensitive data packets during the real-time intervals and to continue them afterwards. In this way, the coexistence of time-sensitive and non-time-sensitive communication is made possible in a TSN-capable network.

During the course of the increasing digitization and linking of facilities (e.g., of an entire production site), there is a necessity to enable communication between fieldbuses as well as communication between a fieldbus and equipment at a higher-level control level, process control level, operation control level, and/or corporate level. The linking relates to both non-time-sensitive data and time-sensitive data.

It is true that most of the real-time protocols for fieldbuses in common use today are based on Ethernet, but there are technical differences despite this commonality so that different fieldbus types are incompatible or not fully compatible with one another. It may also be the case that different generations of fieldbuses are used, for example when components of an installation are added, replaced, or upgraded, wherein fieldbuses of different generations are not necessarily fully compatible. Efforts are currently underway to specify universally applicable real-time protocols, which are intended to replace the many proprietary and mutually incompatible protocols for time-sensitive fieldbuses. However, their use will require the replacement or conversion of existing fieldbus systems, which oftentimes is not economically feasible.

Existing solutions for the time-sensitive communication between two or more fieldbuses assume that all fieldbuses to be coupled have a uniform understanding of time, but wherein all time offsets as well as durations and/or start times of the fieldbus communication cycles are also synchronized. Fieldbuses frequently also undergo complex configuration at the start of a production run, however, so that the machines and/or facility components controlled by the fieldbus are optimally matched to one another. An adjustment of the cycle times of an existing fieldbus to newly added facility components with additional fieldbuses would require a reconfiguration of the existing processes controlled by the fieldbus, however.

A need therefore exists to link time-sensitive fieldbuses to one another that are not completely compatible with each other.

SUMMARY OF THE INVENTION

It is therefore an object of the present invention to provide a method for linking a first time-sensitive fieldbus to a second time-sensitive fieldbus, a system for linking at least two time-sensitive fieldbuses, as well as a gateway for time synchronization and for linking at least two time-sensitive fieldbuses.

In an exemplary embodiment, a gateway is used, in particular, that handles the communication between time-sensitive fieldbuses. Since the gateway supports the respective time domain of all fieldbuses connected thereto, the fieldbuses can communicate with one another largely without adjustment of the time domains and, in particular, of the times of the communication cycles defined within the fieldbuses. This applies to both time-sensitive data and non-time-sensitive data.

An aspect of the present invention relates to a method for linking a first time-sensitive fieldbus to a second time-sensitive fieldbus. The first time-sensitive fieldbus includes a first subscriber device and has its own first time domain. The second time-sensitive fieldbus includes a second subscriber device and has a second time domain of its own. The first time domain and the second time domain are frequency-synchronized. The first and second fieldbuses are connected to one another via a gateway for data transmission. The method includes the determination of a first cycle duration of the first time domain and of a second cycle duration of the second time domain by the gateway at a reference time as well as the determination of a time offset between the first time domain and the second time domain by the gateway at the reference time.

The frequency synchronization can be accomplished through a synchronization of the clock frequencies in the time domains of the first and second fieldbuses. Via such a frequency synchronization, the first and second fieldbuses or the first and second time domains can have differently defined times, but the time offset is time-invariant, which is to say constant over time. Via a synchronization of only the frequencies in the first and second time domains, the time regimes in the fieldbuses can remain largely unaffected. In particular, a hard time jump in one or both fieldbuses, which could otherwise occur during adjustment of the first and second fieldbus times, is avoided. The adjustment of the frequencies can be accomplished here over a period of time that does not impair the operation of the processes running in the fieldbuses.

Owing to the fact that the gateway carries out the determination of the first cycle duration of the first time domain and the second cycle duration of the second time domain at a reference time, as well as the determination of a time offset between the first time domain and the second time domain at the reference time, the gateway can act as a mediator or "interpreter" between the time regimes of the fieldbuses. This function can optionally be implemented as a proxy functionality in which the gateway provides a virtual representation of a subscriber device of the first fieldbus and/or a virtual representation of a subscriber device of the second fieldbus, wherein the virtual representations of the subscriber devices are set up to function as schedulers ("scheduler proxy") in order to negotiate or otherwise determine time slots for time-critical communication with subscriber devices of the respective other fieldbus. The negotiation or determination can be accomplished according to the method defined by the IEEE 802.1QBv standard, for example. A scheduler proxy of this nature can function in this case as the interface for the protocols for setting up time slots for time-sensitive communication, and can be accessed by the subscriber devices of a fieldbus in the same manner as other subscriber devices of the same fieldbus. For example, a scheduler proxy can accept queries for time slots or issue corresponding confirmations according to a specified protocol. Since the gateway knows the first cycle duration, the second cycle duration, and the time offset at a reference time, the gateway can carry out conversions of the time regime. Through the scheduler proxy, the gateway can issue or receive times and/or time intervals that have been or are to be converted in the respective applicable time regime. This eliminates, for example, the need for a conversion between the time regimes in the fieldbuses (e.g., at the application level), by which means a simplification in the set-up of time-sensitive communication is achieved.

The method can further include the step of communicating the first cycle duration of the first time domain to the second fieldbus, and communicating the second cycle duration of the second time domain to the first fieldbus through the gateway. Because the cycle durations of the respective other fieldbus are known to the subscriber devices, they can be used for planning the communication. The step optionally also includes communicating the time offset with respect to the reference time, and the reference time itself, to both field buses through the gateway. A conversion of the time regime to the respective other fieldbus can be carried out by this means if necessary.

The method can further include the receiving by the gateway of a request from the second subscriber device of the second fieldbus for a time slot for the transmission of time-sensitive data from the first fieldbus to the second fieldbus, the handoff by the gateway of the request to the first subscriber device in the first fieldbus, the receiving by the gateway of a confirmation message from the first subscriber device of the first fieldbus, as well as the handoff by the gateway of the confirmation message to the second subscriber device of the second fieldbus. For example, the first subscriber device in the first fieldbus, as a scheduler, is set up to accept such requests, reserve time slots accordingly, and generate and send out confirmation messages. This can be achieved in that the first subscriber device of the first fieldbus can carry out the methods and protocols defined in the IEEE 802.1QBv standard. In this way, a transmission of time-sensitive data between the fieldbuses can be set up.

The method can further have the step of converting by the gateway of times or intervals that relate to the time domain of a fieldbus into times or intervals that relate to the time domain of the respective other fieldbus. In this way, the gateway can function as an "interpreter" between the time regimes of the first and second fieldbuses. Optionally, this can even be designed such that the exchange of times and/or intervals takes place through proxy instances set up in the gateway, which each represent a termination point of the corresponding communication protocols for one fieldbus. For example, a scheduler proxy for the first fieldbus can receive queries from the second fieldbus, using the corresponding communication protocols of the second fieldbus. These queries can contain indications of times and time intervals according to the second time domain, wherein the gateway takes on the converting into the time regime (time domain) of the first fieldbus, and forwards such to the first fieldbus. If a confirmation message or other response from the first fieldbus contains an indication of times or time intervals, these can be converted into times and/or time intervals of the second fieldbus by the gateway and issued by the scheduler proxy to the corresponding subscriber device in the second fieldbus. In this way, subscriber devices can each communicate with the other fieldbus with no need to convert times or time intervals that are to be exchanged into the other time regime. In this way, the connection of field buses having different time domains is simplified significantly.

The method can further include that the request from the second subscriber device of the second fieldbus for a time slot for the transmission of time-sensitive data includes an indication of one or more times and/or one or more time intervals that relate to the time domain of the second fieldbus. In this case the gateway determines the one or more times or the one or more time intervals from the request relating to the time domain of the first fieldbus while taking into account the time offset with respect to the reference time. The request handed off to the first subscriber device in the first fieldbus then contains the indication of the one or more times or the one or more time intervals relating to the time domain of the first fieldbus. The confirmation message from the first subscriber device of the first fieldbus may include an indication of one or more times and/or one or more time intervals that relate to the time domain of the second fieldbus. The gateway determines from this the one or more times or the one or more time intervals from the confirmation message relating to the time domain of the second fieldbus while taking into account the time offset with respect to the reference time so that the confirmation message handed off to the second subscriber device of the second fieldbus includes the indication of the one or more times and/or the one or more time intervals relating to the time domain of the first fieldbus. Consequently, no conversion of the time regime need take place in either the first fieldbus or the second fieldbus. Instead, the first and second fieldbuses have the time indications from the other fieldbus delivered to them in relation to their own time regime. In an optional embodiment, the gateway can provide a scheduler proxy that functions as a protocol termination point for the second fieldbus and therefore behaves like a subscriber device of the second fieldbus.

The method can further contain a setting of a first time slot for the communication of time-sensitive data in the first fieldbus by the first subscriber device of the first fieldbus. The setting can take place in such a manner that the first time slot of the first fieldbus and the second time slot of the second fieldbus overlap in time. In this case, the region of overlap represents an intersection in time, wherein time-sensitive data can be exchanged between the fieldbuses with no delay or with only slight, manageable delays that satisfy a real-time requirement. This achieves the result that the instance (e.g., time-aware scheduler) that is locally set up for communication of time-sensitive real-time data for the first fieldbus is also responsible for cross-fieldbus communication of time-sensitive real-time data. For example, a subscriber device with a time-aware scheduling function that is already present before the connection can be used for this purpose, so that only minimal changes to an existing fieldbus configuration are necessary.

The method can further include the step of transfer through the gateway of time-sensitive data from the second fieldbus to the first fieldbus or vice versa during the overlap of the first time slot and the second time slot. A timed end-to-end transmission between two subscriber devices across fieldbus boundaries is implemented in this way. The transfer in this case can take place exclusively on the physical layer, for example through an analog signal path through the gateway between ports for the first and the second fieldbus. Delays in the signal transit times can therefore be minimized. An acceptable transfer of the time-sensitive data can also be accomplished in that the gateway provides a termination point for the physical layer on the part of the second fieldbus. Then the gateway can receive, demodulate and, if necessary, decode (e.g., relating to channel coding) the signals so that the time-sensitive data are available as data bits at the upper edge of the physical layer. These can then be handed off in the gateway to a physical interface on the part of the first fieldbus, where a coding (e.g., channel coding), and a modulation for the transmission into the first fieldbus take place if necessary. For example, the handoff of the data in the so-called Medium Access Control (MAC) protocol layer can take place through a so-called MAC bridge (e.g., in accordance with the IEEE 802.1D standard). In this way, the MAC protocol header can be read out and modified if necessary for forwarding to the other fieldbus, for example. The transfer of the data can also take place at a higher protocol layer than the MAC layer, wherein the gateway provides the corresponding protocol stack. Owing to the processing in the gateway, delays can result. Since the first or the second time slot is reserved for the transmission of the time-sensitive data, however, a buffering in queues can be largely avoided. The delays that occur can thus be kept predictable and manageable so that the real-time requirements for transmission are fulfilled.

The method can further include the transmitting of non-time-sensitive data between the first fieldbus and the second fieldbus through the gateway in times outside the first time slot of the first fieldbus and outside the second time slot of the second fieldbus. As a result, so-called "best effort data" for configuring individual subscriber devices, for example, or even non-time-critical measurement data or command data, can be exchanged between the fieldbuses, wherein the first and second time slots remain reserved for the exchange of time-sensitive data between the fieldbuses. The gateway can carry out buffering of data for best effort data. An exchange of best effort data is also possible if no shared time slot is set up for the exchange of time-sensitive data between the fieldbuses. For example, the first and the second fieldbuses can have agreed on time slots independently of one another for the transmission of time-sensitive data within the fieldbuses in each case. The gateway can transmit the best effort data, potentially using buffering, in each case at times outside the time slots for the transmission of time-sensitive data. For example, the described requests and confirmation messages for agreeing on overlapping time slots for the transmission of time-sensitive data between the fieldbuses can be transmitted in this way.

It is possible in practice that further time differences are present in addition to the time offset between the first and second time domains, for example relating to different durations of the first and second time slots as well as the position in time of first and second time slots for the transmission of time-sensitive data. Time-sensitive data can be transferred between the fieldbuses through the gateway in a region in which the first and second time slots overlap. Time slots for the transmission of time-sensitive data can nonetheless be reserved in the first or second fieldbus outside the region of overlap, wherein these time periods can be used for the transmission of time-sensitive data within the fieldbuses independently of one another, for example.

To carry out the said frequency synchronization of the first and second time domains, the gateway can have a first timing element and a second timing element. For frequency synchronization of the two fieldbuses, the first timing element may, for example, be synchronized as a slave with the first time domain of the first fieldbus. In addition, the second timing element may be synchronized as a slave with the second time domain of the second fieldbus. In that case, only the frequency of the first timing element can initially be synchronized as a slave with the frequency of the second time domain of the second timing element, and thereafter the first timing element can be set as the master for the first fieldbus in order to set the frequency of the first fieldbus to the frequency of the first timing element.

Since the gateway has its own timing elements, which are synchronized with one another in frequency (e.g., only in frequency), the gateway knows the time defined in each case in the first and second time domains, and can, for example, coordinate the transmission of non-time-sensitive data such that the time slots for the transmission of time-sensitive data are not touched. Moreover, once frequency synchronization has taken place, it is guaranteed that, although the time differences between the fieldbuses are still present, they are nonetheless time-invariant, and thus do not "get out of hand." In the scenario described, the first fieldbus derives its time base from the second fieldbus, wherein the setting of the first timing element as the master for the first fieldbus represents only a minor intervention in the time regime of the first fieldbus. For example, the setting to the frequency of the first timing element can take place over a time period that avoids a hard time jump. The first field bus can thus be synchronized "under load" during operation.

A further aspect of the invention relates to a system for linking at least two time-sensitive fieldbuses, having a first time-sensitive fieldbus, having a first subscriber device and its own first time domain, wherein the first time domain contains first time slots for the transmission of time-sensitive data. The system further has a second time-sensitive fieldbus, having a second subscriber device and its own second time domain, wherein the second time domain contains second time slots for the transmission of time-sensitive data. In addition, the system includes at least one gateway that connects the first and second fieldbuses to one another for data transmission, wherein the gateway has a determinator for determining a first cycle duration of the first time domain and a second cycle duration of the second time domain at a reference time. The gateway further has a determinator for determining a time offset between the first time domain and the second time domain at the reference time. The system is set up to carry out the steps (e.g., all steps) of the above-described method, for example.

A further aspect of the invention relates to a gateway for linking at least two time-sensitive fieldbuses with different time domains. The gateway has a determinator for determining a first cycle duration of a first time domain and a second cycle duration of a second time domain at a reference time. In addition, the gateway has a determinator for determining a time offset between the first time domain and the second time domain at the reference time. Embodiments of the gateway further have components for carrying out the (or any) method steps in the above-described method that are carried out by the gateway mentioned there.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
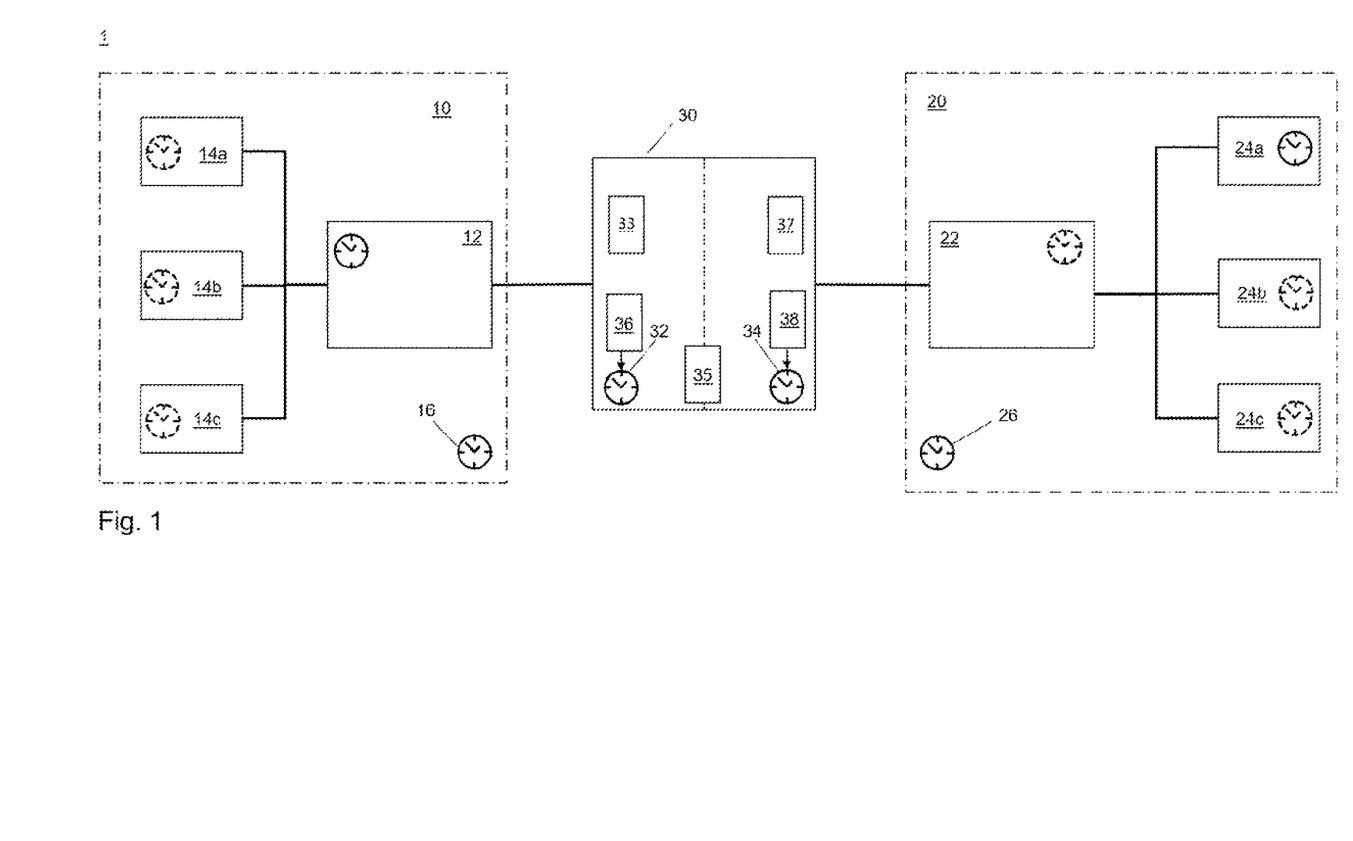
FIG. 1 shows a block diagram of a system with a first time-sensitive fieldbus and with a second time-sensitive fieldbus.

FIG. 1 shows a block diagram of an exemplary system 1 with a first time-sensitive fieldbus 10 and a second time-sensitive fieldbus 20. The first fieldbus 10 and the second fieldbus 20 include, by way of example, the subscriber devices 12, 14a-c, or 22, 24a-c respectively, wherein the subscriber devices 12, 22 are each controllers of the fieldbus, for example a programmable controller, a programmable logic controller, PLC, a node, or another industrial controller, and the subscriber devices 14a-c or 24a-c are field devices, for example I/O components for sensors and/or actuators that can measure or influence the variables of a process automated by the fieldbus. The subscriber devices 12, 14a-c, or 22, 24a-c, respectively, are connected to one another in the respective fieldbus 10, 20 through an interface so as to communicate with one another, wherein the definition of the interface includes an interface protocol.

The subscriber devices 12, 14a-c of the first fieldbus 10 belong to a first time domain 16, wherein all subscriber devices 12, 14a-c have the same understanding of an absolute time. To this end, each subscriber device 12, 14a-c has one timing element, schematically symbolized in FIG. 1 by the face of a clock. In corresponding fashion, the subscriber devices 22, 24a-c of the second fieldbus 20 belong to a second time domain 26. In the fieldbuses 10 and 20, the fieldbus lines are connected to the field devices in a star topology originating from the controller 12, 22. In general, fieldbuses can also be formed using other topologies, e.g., tree topology, bus topology, ring topology. It is also possible that at least some of the subscriber devices 12, 14a-c or 22, 24a-c of a fieldbus 10, 20 are connected to one another through a wireless network.

One subscriber device 12, 14a-c or 22, 24a-c in each case specifies the time for the respective fieldbus 10 or 20 and is therefore referred to as master. In the case of the first fieldbus 10, for example, the controller 12 is the master, which is represented in FIG. 1 as a clock face with solid lines. In the case of the second fieldbus 20, for example, the subscriber device 24a is the fieldbus master. The clock of a master 12 or 24a specifies the time in the fieldbus in each case here, wherein the remaining subscriber devices of a fieldbus, which is to say subscriber devices 14a-c in the first fieldbus or subscriber devices 22, 24b-c, respectively, each derive their time from the master. This occurs, for example, in that the subscribers within a fieldbus exchange messages at regular or irregular intervals according to the Precision Time Protocol of the IEEE 1588 standard, and thus obtain and maintain a shared understanding of the time in this way.

Within the first fieldbus 10 and the second fieldbus 20, non-time-sensitive as well as time-sensitive data can be transmitted in each case, as will be described in more detail below. For example, the data transmission in both fieldbuses can be divided into transmission cycles in accordance with the IEEE 802.1Q standard, wherein first time slots are defined in the first fieldbus 10 and second time slots in the second fieldbus 20, in which a transmission of real-time data between two subscriber devices of the same fieldbus in each case is possible. The transmission of real-time data can be a timed end-to-end transmission between two subscriber devices, or a transmission with slight delays that are known, deterministic, or causally manageable in that they satisfy real-time requirements.

One or more subscriber devices of the respective fieldbus can each have a scheduler function for definition of the transmission cycles and time slots for the transmission of time-sensitive data. The scheduler is responsible for defining the cycle durations in the first or the second fieldbus, respectively, and communicating them to the other subscriber devices of the respective fieldbus. In addition, a scheduler can be set up to accept queries relating to the transmission of time-sensitive data in the first or the second fieldbus, respectively, to manage granted time slots, to conduct communication with a querying subscriber device for the negotiation of time slots for time-sensitive transmission, and to confirm or deny the queries accordingly. The scheduler can additionally be set up to communicate granted time slots for the transmission of time-sensitive data to the other subscriber devices. Hereinafter, it should be assumed that at least one of the subscriber devices 12, 24a-c can function as a scheduler in the first fieldbus 10 and carries out the corresponding protocols (e.g., in accordance with the IEEE 802.1Q standard). It is likewise assumed that at least one of the subscriber devices 22, 24a-c performs a scheduler function in the second fieldbus 20.

The system 1 further includes a gateway 30, through which the two fieldbuses 10, 20 are connected to one another so as to communicate. Even though FIG. 1 shows that the fieldbuses 10, 20 are connected to one another through their controllers 12 and 22, this nevertheless is not mandatory. Instead, the gateway 30 has an interface to each of the fieldbuses 10 and 20 so that it represents a subscriber device in regard to the respective fieldbus 10, 20. The gateway 30 supports at least two time domains 32 and 34 in this case. Additional time domains can be supported in accordance with the number of fieldbuses to be connected. In particular, the gateway includes timing elements 36 and 38 that can be configured for the first time domain 16 or for the second time domain 26.

The gateway 30 additionally contains time conversion units 33 and 37. The time conversion units here can be configured such that they function as "interpreters" between different time domains. For example, the time conversion unit 33 can be set up to receive time indications (which is to say, indications relating to times and/or time intervals) that relate to the time domain 34 supported by the gateway 30, and to convert them into corresponding time indications of the time domain 32. In the reverse direction, the time conversion unit 33 can be set up to convert and to issue time indications from the time domain 32 into those of the time domain 34. For the purpose of conversion, the time conversion unit 33 can, for example, determine a time offset between the timing elements 38 and 36 at a reference time, and take them into account correspondingly in the conversion. In corresponding fashion, the time conversion unit 37 can be set up to receive time indications that relate to the time domain 32 supported by the gateway, and to convert them into corresponding time indications of the time domain 34, and in the reverse direction to convert and issue time indications from the time domain 34 as those of the time domain 32.

The gateway 30 can connect the first fieldbus 10 and the second fieldbus 20 to one another for data transmission. To this end, the gateway 30 maintains a memory 35 for buffering or temporarily storing data. For example, non-time-sensitive data can be stored in the memory 35. The gateway 30 can also conduct a transmission of time-sensitive data between the first and second fieldbuses 10, 20 during defined time slots, however. In order to define or negotiate such time slots, the time conversion units 33 or 37 can be used. For example, the time conversion unit 33 can be set up to carry out a conversion of time indications relating to the first time domain 16 in that it communicates with subscriber devices of the second fieldbus 20, and in doing so accepts or issues time indications corresponding to the second time domain. In corresponding fashion, the time conversion unit 37 can communicate with subscriber devices of the first fieldbus 10 in order to accept or issue time indications relating to the first time domain 16 and convert them with respect to the second time domain 26.

Figure 2:
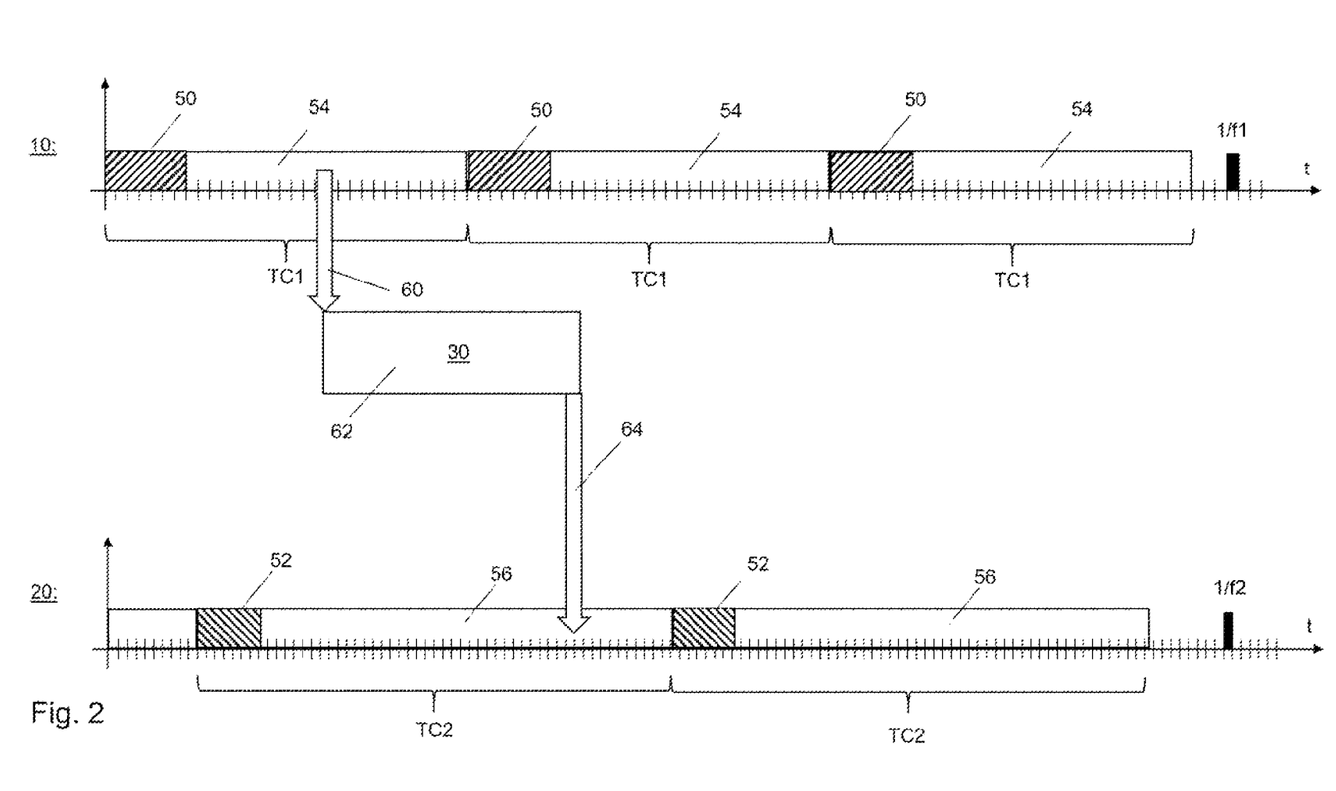
FIG. 2 schematically shows a timing diagram of a first and a second fieldbus as well as the transmission of non-time-sensitive data through the gateway.

FIG. 2 shows an exemplary timing diagram of the first fieldbus 10 and the second fieldbus 20. Here, the first fieldbus 10 has communication or transmission cycles with periodically repeating cycle intervals TC1, which are defined according to the top timeline in FIG. 2 in terms of position and duration. Correspondingly, the second fieldbus 20 has communication cycles with periodically repeating cycle intervals TC2, which are defined according to the bottom timeline in FIG. 2 in terms of position and duration. In FIG. 2, the reciprocal of the clock frequencies 1/f1 or 1/f2, namely the clock cycle duration, is illustrated in each case by a black bar. Even when both clock frequencies f1 and f2 nominally (i.e., according to a specification) have the same frequencies, it is possible that the clocks of the time domains 16 and 26 of the two fieldbuses run at different speeds if the actual values of the clock frequencies f1 and f2 differ slightly.

In the fieldbuses 10, 20, first time slots 50 or second time slots 52 can be defined, negotiated, or determined for the transmission of time-sensitive data within the respective fieldbus 10, 20. For this purpose, for example, one of the subscriber devices 12, 14a-c in the first fieldbus 10 as well as one of the subscriber devices 22, 24a-c in the second fieldbus 20 can be configured as a time-aware scheduler (scheduler that supports real time) according to the IEEE 802.1QBv standard. Merely by way of example, the first time slots 50 and the second time slots 52 coincide with the start of the corresponding communication cycles. In general, the time slots 50, 52 for time-sensitive transmission can be situated at any position within a transmission cycle. It is also possible to define multiple separate timeslots 50, 52 per transmission cycle for time-sensitive communication.

FIG. 2 further shows time periods 54 and 56, which belong to the respective transmission cycles located outside the time slots 50 and 52 reserved for the transmission of time-sensitive data. In these intervals 54, 56, non-time-sensitive data can be transmitted within the fieldbuses 10, 20, for example using the Ethernet protocol, for which the CSMA/CD (Carrier Sense Multiple Access with Collision Detection) access method applies.

For connection of the gateway 30, in an exemplary embodiment, first the timing elements 36 and 38 of the gateway 30 are synchronized as slaves with respect to the time domains 16, 26 of the fieldbuses 10 and 20. In this way, the gateway has a synchronized interface as a subscriber device to both the first fieldbus 10 and the second fieldbus 20. Consequently, the corresponding cycle durations TC1 and TC2, the position in time of the communication cycles, as well as the time slots 50 and 52 in which time-sensitive communication is handled in the respective fieldbuses 10, 20 are also known by the gateway 30.

This makes it possible, first of all, to exchange non-time-sensitive data even between the fieldbuses. Such a transmission can be accomplished, for example, such that non-time-sensitive data 60 are transmitted to the gateway 30 by the first fieldbus 10 during a first non-time-sensitive interval 54, as symbolized by the arrow 60 in FIG. 2. These data 60 can be buffered in the buffer memory 35 of the gateway 30, as is symbolized by the step 62. Finally, the buffered data can be transmitted by the gateway 30 to the second fieldbus 20 during intervals 56 outside the second time slots 52, as symbolized by the arrow 64. For example, in order to send out the data 64 to the second fieldbus, the gateway 30 must ensure via the CSMA/CD method or another contention method that the second fieldbus 20 is free for transmission during the time slots 56.

An exchange of non-time-sensitive data 60, 64 between the fieldbuses can be used for the purpose of supporting a frequency synchronization of the first time domain (16) and the second time domain (26). Owing to such a synchronization of the timing element clock frequencies, the time offset between the times of the two time domains 16, 26 remains stable, simplifying the determination of times in the gateway 30 or in the subscriber devices 12, 14a-c, or 22, 24a-c, of the first and second fieldbuses with regard to the respective other time domain 16, 26. To this end, the following method for synchronization of the clock frequencies f1 and f2 of the timing elements 36 and 38 shall be described by way of example. In one embodiment, the clock generators 36, 38 of the gateway 30 are initially synchronized as slaves of the first time domain 16 or second time domain 26, and have the same nominal frequency. A frequency synchronization can now be accomplished such that the first timing element 36 of the gateway 30 is determined as master for the first fieldbus 10, so that the gateway 30 can determine the time setting in the first fieldbus. Furthermore, a synchronization of the frequency f1 of the first timing element 36 of the gateway 30 to the frequency f2 of the second time domain 26 can take place. A synchronization of only the frequencies f1 and f2 in the time domains 16, 26 can avoid time jumps of the subscriber devices in the first fieldbus 10. The synchronization of the frequencies in this case can take place during ongoing operation of the fieldbus 10 over an adaptation period that is chosen to be long enough that the processes of the first fieldbus 10 can run without disruption.

Figure 3:
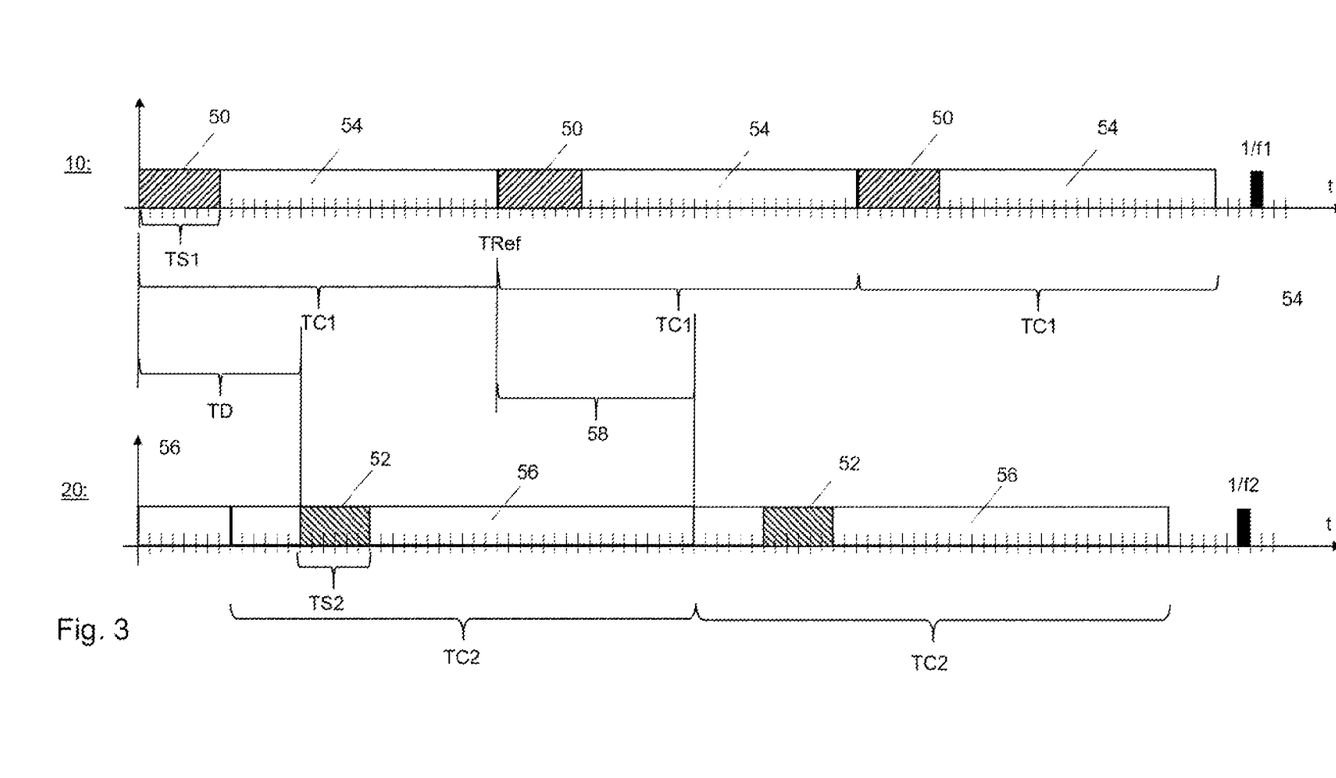
FIG. 3 schematically shows a detailed timing diagram of the cycle times defined for a first and a second fieldbus.

FIG. 3 schematically shows a detailed timing diagram of the cycle times defined for the first and second fieldbuses 10, 20 according to some aspects of the invention. In one example, the clock generators in the subscriber devices of the fieldbuses 10 and 20 can have the same clock frequencies f1=f2 according to the above-described method, for example. In FIG. 3, the reciprocal of the clock frequencies 1/f1 or 1/f2, namely the clock cycle duration, is illustrated in each case by a black bar.

In the present example, only the clock frequencies between the first and second fieldbuses 10, 20 are synchronized. For this reason, a time offset 58 can occur between the start times of the communication cycles. Such a time offset 58 arises on the one hand because of the different definition of the time in the two fieldbuses 10, 20, and on the other hand also from the difference between the start times of the communication cycles of the first fieldbus 10 and second fieldbus 20, even if both fieldbuses were to have the same understanding of time. Moreover, the communication cycles can have different durations TC1 and TC2. For this reason, the time offset 58 can in general only be defined with reference to an (absolute) reference time TRef. The absolute reference time TRef can be expressed correspondingly both in the time of the first fieldbus 10 and in the time of the second fieldbus 20 in this case. If the durations TC1 and TC2 are in a rational ratio to one another, then a specific time offset 58 repeats after a predictable number of cycles of the first or of the second fieldbus. If, for example, the cycle duration TC1 in the first fieldbus is 50 ms and the cycle duration TC2 in the second fieldbus is 25 ms, then the time offset 58 can, for example, be zero after a first cycle in the second fieldbus, 25 ms as compared with the first fieldbus after a second cycle in the second fieldbus, and then zero again, and so on. If the time offset 58 is known at a time TRef, however, then it is possible to determine the time offset 58 in advance for all communication cycles of the first and second fieldbuses, even if the cycle durations TC1 and TC2 are not in a rational ratio to one another.

In addition, different durations TS1 and TS2 of the first and second time slots 50 or 52 for the time-sensitive communication can occur on the fieldbuses 10 and 20, since these can be agreed independently of one another for the two fieldbuses 10 and 20. Furthermore, the first and second time slots 50 or 52 can have different time differences TD in the start times. These, in turn, generally can only be determined predictably with respect to an absolute reference time TRef, since start times of the time slots 50 and 52 for the time-sensitive communication can vary with the cycle times in the individual fieldbuses.

After frequency synchronization has taken place, the gateway 30 can determine the cycle durations TC1 and TC2 in the first and second fieldbuses 10, 20 at a reference time TRef. In addition, the gateway 30 can determine the time offset 58 between the first and second time domains 16, 26 at the reference time TRef. The gateway 30 can further communicate the cycle duration TC1 of the first time domain 16 to the second fieldbus 20 and also communicate the cycle duration TC2 of the second time domain 26 to the first fieldbus 10. This can take place with respect to the reference time TRef. In this way, specific subscriber devices of the first or second fieldbus 10, 20 can predictably determine the communication cycles of the respective other fieldbus 20, 10.

However, in order to set up overlapping first and second time slots in the first or second fieldbus for the communication of time-sensitive data, the gateway 30 can perform a converting of time indications (i.e., times and/or time intervals) in such a manner that there is no need for any separate conversions to be performed in the first fieldbus 10 and in the second fieldbus 20. To this end, the gateway 30, as described above, is set up to convert time indications relating to the first time domain 16 of the first fieldbus 10 into those of the second time domain 26 of the second field bus 20 via the time conversion units 33 and 37 while taking into account the time offset 58 at the reference time TRef, and vice versa.

In one embodiment, the time conversion unit 33 optionally can additionally be set up to function as a scheduler proxy for the second fieldbus 20, which can negotiate or determine time slots for time-critical communication with the first fieldbus. In this function, the time conversion unit 33 has an interface for setting up time slots in the first fieldbus for time-sensitive communication, for example using the methods defined by the IEEE 802.1QBv standard. In this case, the subscriber devices 22, 24*a*-*c* of the second fieldbus 20 can access the time conversion unit 33 like a scheduler in their own fieldbus, which is to say send corresponding protocol messages for setting up time slots for the time-sensitive communication to the time conversion unit 33 and receive them from it, even though a subscriber device (for example the controller 12) that is set up as a scheduler in the first fieldbus 10 is responsible for setting up time slots in the first fieldbus 10.

In one example, a transmission of time-critical data from the subscriber device 14*c* in the first fieldbus 10 to the subscriber device 24*b* in the second fieldbus 20 is to take place. To this end, the time conversion unit 33 that is set up as scheduler proxy is known to the subscriber device 24*b*, which sends to the time conversion unit, in accordance with a negotiation protocol (e.g., as scheduler in accordance with IEEE802.1Q or another standard), a request that contains time indications (i.e., times and/or intervals) regarding possible time slots 52 in relation to the time domain 26 of the second fieldbus 20.

Upon receiving the request, the time conversion unit 33 of the gateway 30 determines the corresponding time indications for the time slots 52 in relation to the time domain 16 of the first fieldbus 10. This determination takes place while taking into account the time offset 58 with respect to the reference time TRef. The time conversion unit 33 hands off the request to the controller 12, which is functioning as scheduler in the fieldbus 10 by way of example. The handed-off request contains the time indications relating to the time domain 16 of the first fieldbus 10.

The controller 12 compares the proposed time indications with the time slots managed by it, for example while taking into account the cycle duration TC1 in effect in the fieldbus 10, determines one or more time slots 52 for the transmission of time-sensitive data, and sets these up through corresponding communication with the subscriber device 14*c* within the fieldbus 10. In addition, the controller 12 sends a confirmation message to the time conversion unit 33 of the gateway 30 that contains the time indications for the time slot/slots 52. The latter time indications apply here with respect to the time domain 16 of the first fieldbus.

The time conversion unit 33 converts the time indications into the time regime of the second fieldbus 20 and issues them to the subscriber device 24*b* in the second fieldbus 20. The latter subscriber device can set up the time slot/slots 52 with respect to its own time domain 26.

Through the function of the time conversion unit 33, the subscriber devices in both time domains can each determine their time indications with respect to their own assigned time domain, and require no internal conversion, e.g., on the level of the application programs. The query protocol described is intended to serve merely as an example. Other variants of a protocol for setting up time slots for time-sensitive communication are possible, wherein the communication of time indications with the time conversion unit 33 can always be communicated with respect to the time domain of the fieldbus in question. In corresponding fashion, the time conversion unit 37 is available for queries or requests for time slots for the transmission of time-sensitive data of the first fieldbus 10 to the second fieldbus 20.

Since the gateway 30 functions in each case as a subscriber device regarding the first fieldbus 10 and regarding the second fieldbus 20, in some embodiments the scheduler functionality for one or both fieldbuses 10 or 20 can also be taken on by the gateway 30. For example, the time conversion unit 33 can likewise take on a scheduler functionality for the first fieldbus 10 (in place of the controller 12). The gateway 30 in this case can itself negotiate, and configure, time slots for the transmission of time-sensitive data in the first fieldbus 10, wherein the communication of time indications in the first fieldbus 10 can take place in relation to the first time domain, and the communication of time indications in the second fieldbus 20 can take place in relation to the second time domain.

Figure 4:
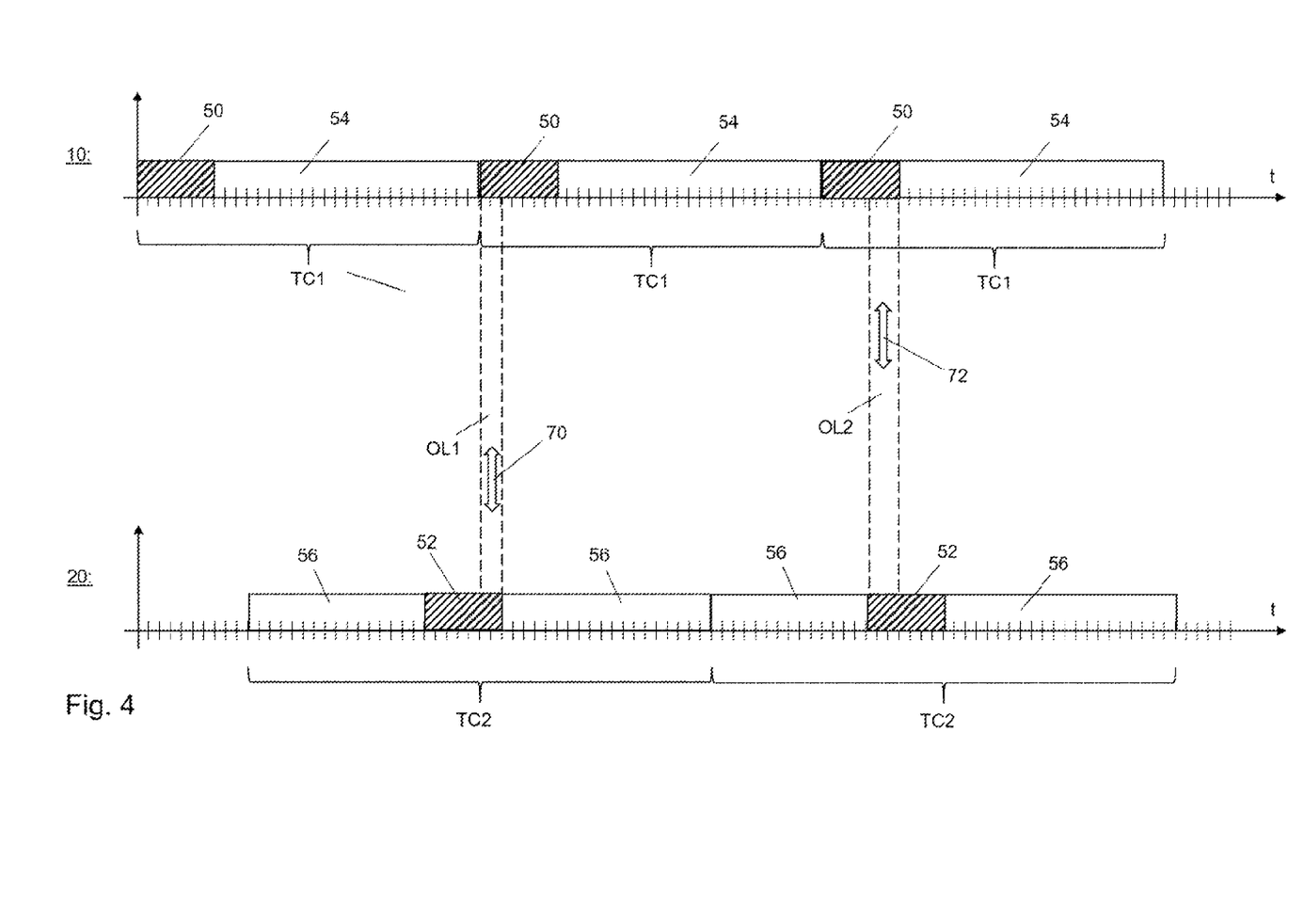
FIG. 4 schematically shows a timing diagram of a first and a second fieldbus as well as the transmission of time-sensitive data through the gateway.

FIG. 4 schematically shows a timing diagram of a first fieldbus 10 and a second fieldbus 20 during a transmission of time-sensitive data. In the present case, time slots 50 in the first fieldbus 10 and time slots 52 in the second fieldbus 20, which at least partially overlap, were agreed for the transmission of time-sensitive data from the subscriber device 14*c* to the subscriber device 24*b*, for example in accordance with the above-described protocol or a comparable protocol. In particular, corresponding subscriber devices of the first and second fieldbuses have agreed on shared regions of overlap OL1 and OL2 in the time slots 50 or 52, respectively, and exchanged this information through the gateway 30 (through the time conversion unit 33, for example), so that this, too, is known to the gateway 30.

In one embodiment, it is not necessary to create a region of overlap OL1, OL2 for the time-sensitive communication in each cycle TC1 or TC2 of the first or second fieldbus 10, 20. For example, it can suffice to define a region of overlap during every second, third, etc. cycle of the first or second fieldbus 10, 20.

If the first and second time slots 50 or 52 that are reserved for time-sensitive communication within the fieldbuses are known during the communication cycles of the first and second fieldbuses 10, 20, then the regions of overlap OL1 and OL2 for time-sensitive communication between the fieldbuses can be determined or calculated in a rule-based manner. Then it suffices to determine a single pair of overlapping time slots 50 and 52 at a reference time TRef. The reservation of the time slots 50 or 52 can be carried out in this case by subscriber devices functioning as schedulers in the first or second fieldbuses. In one embodiment, the time conversion units 33 or 37 of the gateway 30 can make available the time indications of the first and second time slots 50 and 52 relative to the fieldbus-internal time domain in each case. The determination of the regions of overlap OL1 and OL2 can thus also take place relative to the fieldbus-internal time domain in each case. If the cycle durations TC1 and TC2 are in a rational ratio to one another, then regularly repeating regions of overlap OL1 and OL2 arise. In this case, the negotiation and/or determination of the time slots 50 and 52 is made easier, so that in these cases a region of overlap OL1, OL2 recurs regularly, and therefore does not have to be negotiated or determined individually.

In one exemplary embodiment, the gateway 30 is further set up to transmit time-critical data 70, 72 during the time slots that overlap in time, e.g., OL1 or OL2. In one embodiment, this is accomplished such that the gateway 30 determines the time slots for time-sensitive transmission 50 and 52 determined between the first and the second fieldbus 10, 20 and, in particular, determines the particular regions of overlap OL1, OL2 and transfers the signals between the first and second fieldbuses during these intervals.

Via the method described, system 1, and the gateway 30, it is possible to link time-sensitive fieldbuses 10, 20 to one another with no need to carry out an adjustment of the fieldbus times and communication cycles of the fieldbuses. As a result, it is possible, in particular, to set up existing fieldbuses, some of which are incompatible with one another, for the exchange of non-time-sensitive data as well as for the exchange of time-sensitive data.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for linking a first time-sensitive fieldbus to a second time-sensitive fieldbus, wherein the first time-sensitive fieldbus includes a first subscriber device and has its own first time domain, wherein the second time-sensitive fieldbus includes a second subscriber device and has its own second time domain, wherein the first time domain and the second time domain are frequency-synchronized, and wherein the first and second fieldbuses are connected to one another via a gateway for data transmission, the method comprising:
   determining, at a reference time by the gateway, a first cycle duration of the first time domain that contains a first time slot for a transmission of time-sensitive data and a second cycle duration of the second time domain that contains a second time slot for a transmission of time-sensitive data; and
   determining, by the gateway, a time offset between the first time domain and the second time domain at the reference time.

2. The method according to claim 1, further comprising:
   communicating, through the gateway, the first cycle duration of the first time domain to the second fieldbus, and communicating, through the gateway, the second cycle duration of the second time domain to the first fieldbus.

3. The method according to claim 1, the method further comprising:
   receiving, by the gateway, a request from the second subscriber device of the second fieldbus for the first time slot for the transmission of the time-sensitive data from the first fieldbus to the second fieldbus;
   handing off, by the gateway, the request to the first subscriber device in the first fieldbus;
   receiving, by the gateway, a confirmation message from the first subscriber device of the first fieldbus; and
   handing off, by the gateway, the confirmation message to the second subscriber device of the second fieldbus.

4. The method according to claim 3, wherein:
   the request from the second subscriber device of the second fieldbus for the first time slot for the transmission of the time-sensitive data includes an indication of one or more times and/or one or more time intervals that relate to the second time domain of the second fieldbus;
   the method further including determining, by the gateway, the one or more times or the one or more time intervals from the request relating to the first time domain of the first fieldbus while taking into account the time offset with respect to the reference time;
   wherein the request handed off to the first subscriber device in the first fieldbus includes the indication of the one or more times or the one or more time intervals relating to the first time domain of the first fieldbus;
   wherein the confirmation message from the first subscriber device of the first fieldbus includes the indication of the one or more times and/or one or more time intervals that relate to the second time domain of the second fieldbus;
   the method further including determining, by the gateway, the one or more times or the one or more time intervals from the confirmation message relating to the second time domain of the second fieldbus while taking into account the time offset with respect to the reference time; and
   the confirmation message handed off to the second subscriber device of the second fieldbus includes the indication of the one or more times and/or the one or more time intervals relating to the first time domain of the first fieldbus.

5. The method according to claim 1, further comprising: converting, by the gateway, times or intervals that relate to either the first time domain of the first fieldbus or the second time domain of the second fieldbus into times or intervals that relate to the other of the first time domain of the first fieldbus or the second time domain of the second fieldbus.

6. The method according to claim 1, the method further comprising:
   setting the first time slot for the communication of the time-sensitive data in the first fieldbus by the first subscriber device of the first fieldbus; and
   setting of the second time slot for the communication of the time-sensitive data in the second fieldbus by the second subscriber device of the second fieldbus,
   wherein the setting of the first and second time slots takes place such that the first time slot of the first fieldbus and the second time slot of the second fieldbus overlap in time.

7. The method according to claim 6, further comprising: transferring, through the gateway, the time-sensitive data from the second fieldbus to the first fieldbus or vice versa during the overlap of the first time slot and the second time slot.

8. The method according to claim 6, further comprising: transferring, through the gateway, non-time-sensitive data between the first fieldbus and the second fieldbus in times outside the first time slot of the first fieldbus and outside the second time slot of the second fieldbus.

9. The method according to claim 6, wherein the first and second time slots have different durations and/or there is a time difference between a start of the first time slot and a start of the second time slot.

10. The method according to claim 1, wherein the gateway has a first timing element and a second timing element, and for frequency synchronization of the first and second fieldbuses the method further comprises:
synchronizing the first timing element as a slave with the first time domain of the first fieldbus;
synchronizing the second timing element as a slave with the second time domain of the second fieldbus;
synchronizing initially only a frequency of the first timing element as a slave with a frequency of the second time domain of the second timing element; and
setting the first timing element as a master for the first fieldbus in order to set a frequency of the first fieldbus to the frequency of the first timing element.

11. A system for linking at least two time-sensitive fieldbuses, the system comprising:
a first time-sensitive fieldbus having a first subscriber device and a first time domain;
a second time-sensitive fieldbus having a second subscriber device and a second time domain; and
at least one gateway that connects the first and second fieldbuses to one another for data transmission,
wherein the gateway determines, at a reference time, a first cycle duration of the first time domain that contains a first time slot for a transmission of time-sensitive data and a second cycle duration of the second time domain that contains a second time slot for a transmission of time-sensitive data, and
wherein the gateway determines a time offset between the first time domain and the second time domain at the reference time.

12. The system according to claim 11, wherein the gateway communicates the first cycle duration of the first time domain to the second fieldbus and communicates the second cycle duration of the second time domain to the first fieldbus.

13. The system according to claim 11, wherein the gateway receives a request from the second subscriber device of the second fieldbus for the first time slot for the transmission of the time-sensitive data from the first fieldbus to the second fieldbus, wherein the gateway hands off the request to the first subscriber device in the first fieldbus, wherein the gateway receives a confirmation message from the first subscriber device of the first fieldbus, and wherein the gateway hands off the confirmation message from the gateway to the second subscriber device of the second fieldbus.

14. The system according to claim 11, wherein the gateway is further set up to convert times or intervals that relate to either the first time domain of the first fieldbus or the second time domain of the second fieldbus into times or intervals that relate to the other of the first time domain of the first fieldbus or the second time domain of the second fieldbus.

15. The system according to claim 13, wherein the request from the second subscriber device of the second fieldbus for the first time slot for the transmission of the time-sensitive data includes an indication of one or more times and/or one or more time intervals that relate to the second time domain of the second fieldbus, wherein the gateway determines the one or more times or the one or more time intervals from the request relating to the first time domain of the first fieldbus while taking into account the time offset with respect to the reference time, wherein the request handed off to the first subscriber device in the first fieldbus includes the indication of the one or more times or the one or more time intervals relating to the first time domain of the first fieldbus, wherein the confirmation message from the first subscriber device of the first fieldbus includes the indication of the one or more times and/or one or more time intervals that relate to the second time domain of the second fieldbus, wherein the gateway determines the one or more times or the one or more time intervals from the confirmation message relating to the second time domain of the second fieldbus while taking into account the time offset with respect to the reference time, and wherein the confirmation message handed off to the second fieldbus includes the indication of the one or more times and/or the one or more time intervals relating to the first time domain of the first fieldbus.

16. The system according to claim 11, wherein the first subscriber device of the first fieldbus is set up to set the first time slot in the first fieldbus for the communication of the time-sensitive data, wherein the second subscriber device of the second fieldbus is set up to set the second time slot in the second fieldbus for the communication of the time-sensitive data, and wherein the setting of the first and second time slots takes place such that the first time slot of the first fieldbus and the second time slot of the second fieldbus overlap in time.

17. The system according to claim 16, wherein the gateway transfers the time-sensitive data from the second fieldbus to the first fieldbus or vice versa during the overlap of the first time slot and the second time slot.

18. A gateway for linking at least a first time-sensitive fieldbus having a first time domain to a second time-sensitive fieldbus having a second time domain, the gateway comprising:
a processor to determine, at a reference time, a first cycle duration of the first time domain that contains a first time slot for a transmission of time-sensitive data and a second cycle duration of the second time domain that contains a second time slot for a transmission of time-sensitive data; and
the processor determining a time offset between the first time domain and the second time domain at the reference time.

19. The gateway according to claim 18, further comprising:
a communicator to communicate the first cycle duration of the first time domain to the second fieldbus and to communicate the second cycle duration of the second time domain to the first fieldbus.

20. The gateway according to claim 18, further comprising:
a receiver to receive a request from a second subscriber device of the second fieldbus for the first time slot for the transmission of the time-sensitive data from the first fieldbus to the second fieldbus;
a handler to hand off the request to a first subscriber device in the first fieldbus;
a receiver to receive a confirmation message from the first subscriber device of the first fieldbus; and
a handler to hand off the confirmation message from the gateway to the second subscriber device of the second fieldbus.

21. The gateway according to claim 20, wherein the request from the second fieldbus for the first time slot for the transmission of the time-sensitive data includes an indication of one or more times and/or one or more time intervals that relate to the second time domain of the second fieldbus, wherein the gateway determines the one or more times or the one or more time intervals from the request relating to the first time domain of the first fieldbus while taking into account the time offset with respect to the reference time, wherein the request handed off to the first subscriber device in the first fieldbus includes the indication of the one or more times or the one or more time intervals relating to the first time domain of the first fieldbus, wherein the confirmation message from the first subscriber device of the first fieldbus includes the indication of the one or more times and/or one or more time intervals that relate to the second time domain of the second fieldbus, wherein the gateway determines the one or more times or the one or more time intervals from the confirmation message relating to the second time domain of the second fieldbus while taking into account the time offset with respect to the reference time, and wherein the confirmation message handed off to the second fieldbus includes the indication of the one or more times and/or the one or more time intervals relating to the first time domain of the first fieldbus.

22. The gateway according to claim 20, wherein the gateway transfers the time-sensitive data from the second fieldbus to the first fieldbus or vice versa during an overlap of the first time slot of the first fieldbus and the second time slot of the second fieldbus.

23. The gateway according to claim 18, wherein the gateway is further set up to convert times or intervals that relate to either the first time domain of the first fieldbus or the second time domain of the second fieldbus into times or intervals that relate to the other of the first time domain of the first fieldbus or the second time domain of the second fieldbus.

* * * * *